United States Patent
Seo et al.

(10) Patent No.: US 8,245,071 B2
(45) Date of Patent: Aug. 14, 2012

(54) METHOD AND APPARATUS OF PROCESSING DATA INDEPENDENTLY AND SYNCHRONIZING AND OUTPUTTING PROCESSED DATA

(75) Inventors: Hyung-jin Seo, Hwaseong-si (KR); Du-il Kim, Suwon-si (KR); Jae-young Lee, Yongin-si (KR); Sung-hyun Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 877 days.

(21) Appl. No.: 12/199,289

(22) Filed: Aug. 27, 2008

(65) Prior Publication Data
US 2009/0172456 A1    Jul. 2, 2009

(30) Foreign Application Priority Data

Jan. 2, 2008    (KR) .................. 10-2008-0000159

(51) Int. Cl.
| | | |
|---|---|---|
| *G06F 1/04* | (2006.01) | |
| *G06F 1/12* | (2006.01) | |
| *G06F 15/16* | (2006.01) | |
| *G06F 13/42* | (2006.01) | |
| *H04L 5/00* | (2006.01) | |
| *H04L 7/00* | (2006.01) | |

(52) U.S. Cl. .................. 713/400; 713/375; 713/401
(58) Field of Classification Search .................. 713/400, 713/401, 375
See application file for complete search history.

(56) References Cited

U.S. PATENT DOCUMENTS

| | | | | |
|---|---|---|---|---|
| 3,995,120 | A * | 11/1976 | Pachynski, Jr. ............... | 370/517 |
| 5,603,016 | A * | 2/1997 | Davies ......................... | 713/400 |
| 5,764,965 | A * | 6/1998 | Poimboeuf et al. .......... | 713/400 |
| 5,936,859 | A * | 8/1999 | Huang et al. .................. | 375/354 |
| 5,978,831 | A * | 11/1999 | Ahamed et al. ............... | 718/105 |
| 6,665,751 | B1* | 12/2003 | Chen et al. ..................... | 710/52 |
| 7,158,045 | B1* | 1/2007 | Gudmunson et al. ......... | 348/515 |
| 7,349,389 | B2* | 3/2008 | Nie .............................. | 370/389 |
| 7,474,724 | B1* | 1/2009 | Gudmunson et al. ......... | 375/376 |

(Continued)

FOREIGN PATENT DOCUMENTS

EP    1289305 A2 *    3/2003

(Continued)

OTHER PUBLICATIONS

"NNRD434147: Improved Audio/Video Synchronization Method", Jun. 1, 2000, IBM, IBM Technical Disclosure Bulletin, Iss. 434, p. 1131.*

(Continued)

*Primary Examiner* — Faisal M Zaman
(74) *Attorney, Agent, or Firm* — Sughrue Mion, PLLC

(57) ABSTRACT

Provided are a method and apparatus for controlling a plurality of data processing modules that process data independently and output the processed data. A method of controlling a first data processing module and a second data processing module that process data independently and synchronize and output the processed data, the method including acquiring first data output rate information representing a current data output rate of the first data processing module, acquiring second data output rate information representing a current data output rate of the second data processing module, and adjusting a data output rate of at least one of the first data processing module and the second data processing module, on the basis of the first data output rate information and the second data output rate information.

19 Claims, 6 Drawing Sheets

U.S. PATENT DOCUMENTS

| | | | |
|---|---|---|---|
| 7,561,601 B2 * | 7/2009 | Baina et al. | 370/512 |
| 7,907,212 B2 * | 3/2011 | Girardeau et al. | 348/515 |
| 2002/0055088 A1 * | 5/2002 | Feig | 434/185 |
| 2003/0035064 A1 * | 2/2003 | Torikoshi et al. | 348/515 |
| 2003/0194004 A1 * | 10/2003 | Srinivasan | 375/240 |
| 2004/0090555 A1 * | 5/2004 | Megeid | 348/515 |
| 2007/0200964 A1 * | 8/2007 | Lee | 348/838 |
| 2008/0012985 A1 * | 1/2008 | Yu et al. | 348/515 |
| 2008/0034041 A1 * | 2/2008 | Kang et al. | 709/205 |
| 2008/0111887 A1 * | 5/2008 | Cooper et al. | 348/194 |
| 2008/0123789 A1 * | 5/2008 | Shin et al. | 375/354 |
| 2008/0152309 A1 * | 6/2008 | Shih et al. | 386/96 |
| 2008/0168294 A1 * | 7/2008 | Batson et al. | 713/400 |
| 2008/0168470 A1 * | 7/2008 | Bushell et al. | 719/313 |
| 2008/0188266 A1 * | 8/2008 | Carter et al. | 455/561 |
| 2008/0291891 A1 * | 11/2008 | Jerlhagen et al. | 370/350 |
| 2009/0046175 A1 * | 2/2009 | Ozawa et al. | 348/231.99 |

FOREIGN PATENT DOCUMENTS

| | | | |
|---|---|---|---|
| EP | 2261900 A1 * | 12/2010 | |
| JP | 05234253 A * | 9/1993 | |
| JP | 2000350119 A * | 12/2000 | |
| JP | 2002290921 A * | 10/2002 | |
| JP | 2006074740 A * | 3/2006 | |
| WO | WO 2009135088 A2 * | 11/2009 | |

OTHER PUBLICATIONS

"NN9710123: Structured Metadata for Application Specfic Viewers for Streamed Internet Video/Audio", Oct. 1, 1997, IBM, IBM Technical Disclosure Bulletin, vol. 40, Iss. 10, pp. 123-128.*

"NB9404271: Remote Control and Synchronization of Multimedia Workstations", Apr. 1, 1994, IBM, IBM Technical Disclosure Bulletin, vol. 37, Iss. 4B, pp. 271-274.*

"NA930671: National Language Support Duration Specification", Jun. 1, 1993, IBM, IBM Technical Disclosure Bulletin, vol. 36, Iss. 6A, pp. 71-72.*

* cited by examiner

METHOD AND APPARATUS OF PROCESSING DATA INDEPENDENTLY AND SYNCHRONIZING AND OUTPUTTING PROCESSED DATA

CROSS-REFERENCE TO RELATED PATENT APPLICATION

This application claims priority from Korean Patent Application No. 10-2008-0000159, filed on Jan. 2, 2008, in the Korean Intellectual Property Office, the disclosure of which is incorporated herein in its entirety by reference.

BACKGROUND OF THE INVENTION

1. Field of the Invention

Apparatuses and methods consistent with the present invention relate to controlling a data processing module, and more particularly, to controlling a plurality of data processing modules that process and output data independently.

2. Description of the Related Art

With development of Internet communications, the types and volumes of data are greatly increasing. Accordingly, the types and volumes of programs for processing data are also increasing. However, in the case of processing data in a format different from or similar to an existing format, an extra program has to be created, and accordingly, resources are wasted unnecessarily. In order to solve the problem, a data processing structure based on a pipe and filter architecture has been developed.

The pipe and filter architecture is a method of processing data in a desired format by combining independent modules that have been manufactured in advance. In the pipe and filter architecture, modules are referred to as "media components" or "filters".

The pipe and filter architecture can improve extensibility greatly by properly combining modules that have been manufactured in advance to process data in various formats. Also, since a module is repeatedly used to process data in various formats, the effective use of resources is possible.

However, since modules which process data at different processing rates process data independently, it is inconvenient in that data input to two or more modules has to be synchronized to each other when it is output from the respective modules.

FIG. 1 is a block diagram of a data processing system 100 based on a pipe and filter architecture, according to a related art technique.

It is assumed that the data processing system 100 is a system which outputs input A/V data.

A filter A 110, which is a demodulation unit, demodulates input A/V data and classifies the A/V data into video data and audio data. The video data is transferred to a filter B 122, and the audio data is transferred to a filter D 124.

The filter B 122, which is a video decoder, decodes the video data and transfers the decoded video data to a filter C 132.

The filter D 124, which is an audio decoder, decodes the audio data and transfers the decoded audio data to a filter E 134.

The filter C 132, which is a video renderer, performs a rendering process of combining the decoded video data and creating a picture, and outputs the picture to a display unit.

The filter E 134, which is an audio renderer, performs a rendering process on the decoded audio data, and outputs the result of the rendering to a speaker. At this time, the filter C 132 and the filter E 134 have to synchronize the video and audio data and output the synchronized data to the display unit and the speaker.

In order to synchronize data in the filter C 132 and the filter E 134, a reference time such as a system time clock (referred to as "STC") and time information such as a Presentation Time Stamp (referred to as "PTS") included in the data are used. The STC represents reference time information which is used as a reference clock signal in a system, and the PTS represents a time at which data is to be output.

A conventional method of synchronizing video data will be now described with reference to the filter C 132. The filter C 132 compares a PTS of video data that is to be output with an STC, and waits without outputting the video data until the STC reaches the PTS. The filter C 132 checks the STC periodically or calculates a difference between the STC and the PTC, thus outputting the video data when the STC reaches the PTS. If the STC exceeds the PTS, the filter C 132 outputs the video data according to an algorithm, or discards the video data.

As such, the conventional method of synchronizing data using an STC or PTS has a problem in that data synchronization is not realized when the STC or PTS is incorrect.

Also, if the STC does not correspond exactly to the PTS, there is no method except for keeping a data output waiting or discarding the data output. Accordingly, fine synchronization cannot be implemented.

Another conventional method of synchronizing data in the filter C 132 and the filter D 134 is to set, instead of an STC, a time which the filter D 134 uses to a reference time. For example, if a time at which the filter D 134 outputs data is set to a reference time, the filter C 132 enables video data having the same PTS value to be output with reference to the time at which the filter D 134 outputs data However, this related art method also cannot implement fine synchronization, like the related art synchronization method using the STC and PTS as described above, and has problems in that synchronization may fail when a PTS is incorrect, and independency between filters, which is an advantage of the pipe and filter architecture, deteriorates greatly, for example, because the filter C 132 has to continuously refer to the time at which the filter D 134 uses.

SUMMARY OF THE INVENTION

The present invention provides a method and apparatus for controlling a plurality of data processing modules so that exact synchronization can be performed, without deteriorating independency between the data processing modules.

According to an aspect of the present invention, there is provided a method of controlling a first data processing module and a second data processing module that process data independently and synchronize and output the processed data, the method comprising:

acquiring first data output rate information representing a current data output rate of the first data processing module, and second data output rate information representing a current data output rate of the second data processing module; and adjusting a data output rate of at least one of the first data processing module and the second data processing module, on the basis of the first data output rate information and the second data output rate information.

At least one of the first data processing module and the second data processing module may be a media component based on a pipe and filter architecture.

The method may further comprise setting first reference output rate information representing a data output rate of the first data processing module, and second reference output rate information representing a data output rate of the second data processing module, in order to synchronize and output the data, wherein the adjusting of the data output rate of the at least one of the first data processing module and the second data processing module is based on the first reference output rate information and the second reference output rate information.

The first data output information may be a first ratio value calculated by expressing as a percentage the current data output rate of the first data processing module with respect to the first reference output rate information, the second data output rate information may be a second ratio value calculated by expressing as a percentage the current data output rate of the second data processing module with respect to the second reference output rate information, the first reference output rate may be a data output rate of the first data processing module to synchronize and output the data, and the second reference output rate may be a data output rate of the second data processing module to synchronize and output data.

At least one of the first reference output rate and the second reference output rate may be set on the basis of metadata about data output acquired from the at least one of the first data processing module and the second data processing module.

The first reference output rate information may be a size of data output from the first data processing module for a unit time from when the data output from the first data processing module is synchronized to data output from the second data processing module, and the second reference output rate information may be a size of the data output from the second data processing module for the unit time from when the data output from the first data processing module is synchronized to the data output from the second data processing module.

The adjusting of the data output rate of the at least one of the first data processing module and the second data processing module may comprise increasing the data output rate of the second data processing module, in proportion to a difference value between the first ratio value and the second ratio value, if the first ratio value is greater than the second ratio value.

The adjusting of the data output rate of the at least one of the first data processing module and the second data processing module may comprise decreasing the data output rate of the second data processing module, in proportion to a difference value between the first ratio value and the second ratio value, if the first ratio value is smaller than the second ratio value.

The first data processing module may be a video renderer, and the second data processing module is an audio renderer.

According to another embodiment of the present invention, there is provided an apparatus of controlling a first data processing module and a second data processing module that process data independently and synchronize and output the processed data, the apparatus comprising:

an output rate information acquiring unit acquiring first data output rate information representing a current data output rate of the first data processing module, and second data output rate information representing a current data output rate of the second data processing module; and an output rate adjusting unit adjusting a data output rate of at least one of the first data processing module and the second data processing module, on the basis of the first data output rate information and the second data output rate information.

Therefore, since data can be synchronized using only current data output rate information and reference output rate information, without using time informant such as an STC and a PTS, it is possible to stably control a data processing module.

Also, since the module control apparatus centralizedly controls a plurality of data processing modules to implement data synchronization, there is no dependency between the data processing modules, and a phenomenon that synchronization becomes unstable due to external conditions is prevented.

Also, unlike a conventional polling method of continuously checking STC values, since data synchronization is performed by an event method under the control of the module control apparatus, system loads can be reduced.

Furthermore, by properly adjusting a maximum value of data that is to be output, system loads can be reduced without being influenced when another task having priority is performed.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described in detail with reference to the attached drawings.

Figure 1:
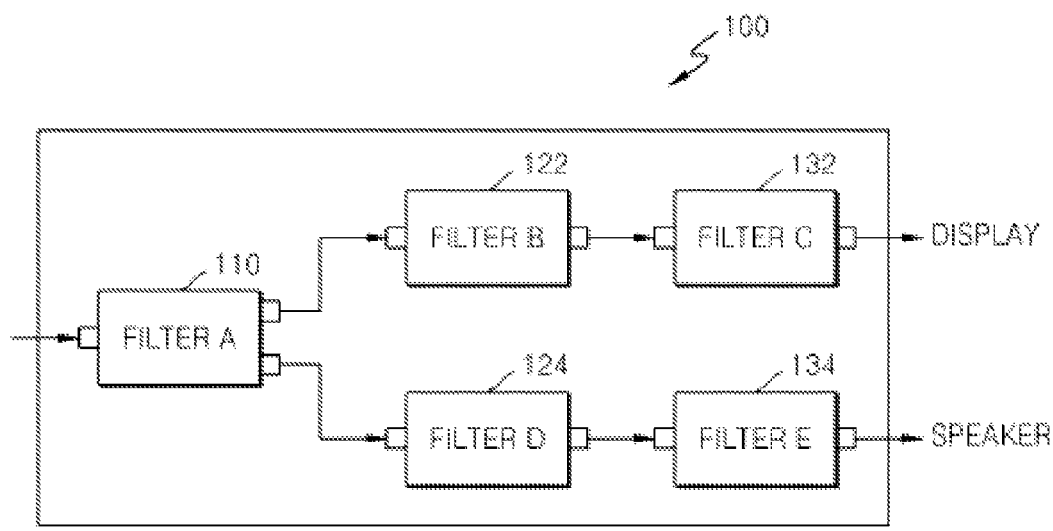
FIG. 1 is a block diagram of a data processing system based on a pipe and filter architecture, according to a related art technique.
Figure 2:
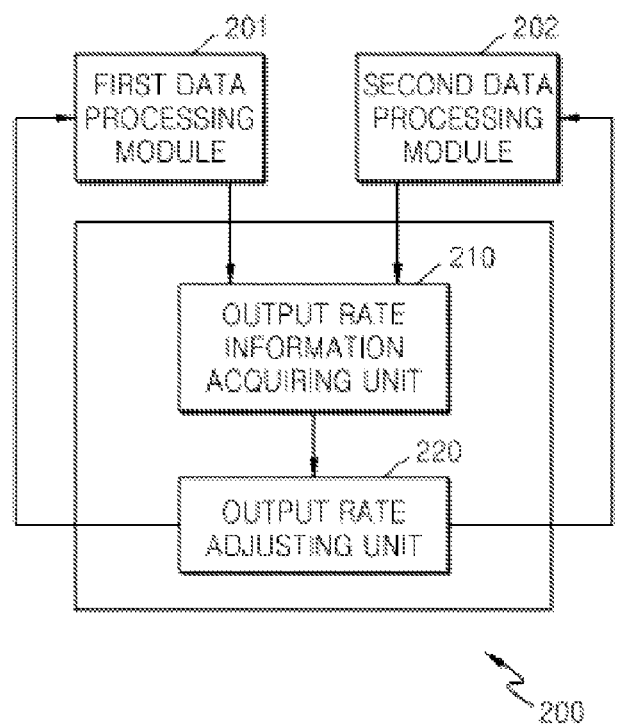
FIG. 2 is a block diagram of a module control apparatus according to an exemplary embodiment of the present invention.

FIG. 2 is a block diagram of a module control apparatus 200 according to an exemplary embodiment of the present invention. The module control apparatus 200 controls a first data processing module 201 and a second data processing module 202 that process data independently and synchronize and output the processed data. At least one of the first and second data processing modules 201 and 202 may be a media component based on a pipe and filter architecture.

In this specification, the term "a first reference output rate" means a data output rate of the first data processing module 201, at which data is synchronized. Likewise, the term "a second reference output rate" means a data output rate of the second data processing module 202, at which data is synchronized.

The module control apparatus 200 includes an output rate information acquiring unit 210 and an output rate adjusting unit 220. The output rate information acquiring unit 210 acquires first data output rate information representing a current data output rate of the first data processing module 201, and second data output rate information representing a current data output rate of the second data processing module 202.

A first reference output rate and a second reference output rate can be set by the module control apparatus 200, or can be set respectively by the first and second data processing modules 201 and 202. Two exemplary embodiments of setting the first and second reference output rates will now be described below.

First, an exemplary embodiment of setting the first and second reference output rates in the module control apparatus 200 is described. When a first reference output rate is set by the module control apparatus 200, the first data output rate information acquired by the output rate information acquiring unit 210 may be the size of data which is output from the first data processing module 201 for a unit time, and also the second data output rate information may be the size of data which is output from the second data processing module 202 for the unit time. Accordingly, the first data output rate information is a current data output rate of the first data processing module 201, and the second data output rate information is a current data output rate of the second data processing module 202.

The module control apparatus 200 can determine the absolute amount of data which is outputted from the first and second data processing modules 201 and 202 for a unit time using the information acquired by the output rate information acquiring unit 210, but cannot determine whether the amount of data outputted is proper. In order to allow the module control apparatus 200 to determine whether the amount of data output from the first and second data processing modules 201 and 202 is proper, it is needed to set reference output rates for the first and second data processing modules 201 and 202.

The module control apparatus 200 further includes a reference output rate setting unit (not shown). The reference output rate setting unit sets a first reference output rate and a second reference output rate. The first reference output rate represents a data output rate of the first data processing module 201, at which data is synchronized, and the second reference output rate represents a data output rate of the second data processing module 202, at which data is synchronized, as described above.

The reference output rate setting unit determines whether metadata for each data processing module exists, in order to set a reference output rate of each data processing module. If metadata for a data processing module exists, the reference output rate setting unit determines a reference output rate on the basis of the metadata. For example, it is assumed that a frame rate indicating the number of video frames which are output for a unit time and a bit rate indicating the number of bits corresponding to a unit frame are stored in metadata acquired from the first data processing module 201. If the frame rate is 30 frames/sec and the bit rate is 100 bits/frame, the first reference output rate will be 30×100 (bit/sec).

If no metadata exists in the first and second data processing modules 201 and 202, the module control apparatus 200 controls the first and second data processing modules 201 and 202 so that data output from the first and second data processing modules 201 and 202 are synchronized. For example, the module control apparatus 200 transmits a STC to the first and second data processing modules 201 and 202 so that data output from the first and second data processing modules 201 and 202 is synchronized.

The reference output rate setting unit sets, to the first reference output rate, the size of data outputted from the first data processing module 201 for a unit time from when data outputted from the data processing modules 201 and 202 is synchronized. Also, the reference output rate setting unit sets, to the second reference output rate, the size of data outputted from the second data processing module 202 for the unit time from when the data outputted from the data processing modules 201 and 202 is synchronized. Particularly, if the first and second data output rate information acquired by the output rate information acquiring unit 210 are transmitted when they are synchronized, the reference output rate setting unit can set the first data output rate information to first reference output rate information, and set the second data output rate information to second reference output rate information.

If the reference output rates for the first and second data processing modules 201 and 202 are set, the output rate adjusting unit 220 determines whether the data output rates of the first and second data processing modules 201 and 202 are proper, on the basis of the first and second data output rate information which are acquired by the output rate acquiring unit 210. In order to determine whether the data output rates of the first and second data processing modules 201 and 202 are proper, the output rate adjusting unit 220 can further include a ratio value calculator (not shown).

The ratio value calculator calculates a first ratio value indicating a ratio of the first data output rate information with respect to the first reference output rate information. Also, the ratio value calculator calculates a second ratio value indicating a ratio of the second data output rate information with respect to the second reference output rate information.

If a current data output rate of the first data processing module 201 is 120 kb/sec and the first reference output rate information is 100 kb/sec, the ratio value calculator calculates "(120/100)×100%" as the first ratio value. Accordingly, the first ratio value is 120%, which means that the first data processing module 201 outputs data faster by 20% than the reference output rate. In an exemplary embodiment of the present invention, each ratio value is calculated as a percentage, however, ratio values may be calculated as a rational number such as "5/6" or as a decimal such as "1.2".

Likewise, if a current data output rate of the second data processing module 202 is 30 kb/sec and the second reference output rate information is 50 kb/sec, the ratio value calculator calculates "(30/50)×100%" as the second ratio value. Accordingly, the second ratio value is "60%", which means that the second data processing module 202 outputs data slower by 40% than the reference output rate.

The output rate adjusting unit 220 adjusts the data output rate of at least one of the first and second data processing modules 201 and 202 on the basis of the first and second ratio values that are calculated by the ratio value calculator. In an exemplary embodiment, the first data processing module 201 outputted data faster by 20% than the reference output rate, and the second data processing module 202 outputted data slower by 40% than the reference output rate. Accordingly, the output rate adjusting unit 220 decreases the data output rate of the first data processing module 201 by 60% of the reference output rate, or increases the data output rate of the second data processing module 202 by 60%, for the next unit time. Or, the output rate adjusting unit 220 can decrease the data output rate of the first data processing module 201 by 30% and simultaneously increase the data output rate of the second data processing module 202 by 30%.

In an exemplary embodiment, if the output rate adjusting unit 220 decreases the data output rate of the first data processing module 201 by 60% of the reference output rate, the first data processing module 201 outputs data at a rate of 40 kb/sec for the next unit time.

However, if the first data processing module 201 does not output data at a rate of 40 kb/sec for the next unit time, the output rate adjusting unit 220 has to adjust the data output rate of the first data processing module 201 in consideration of the fact. In an exemplary embodiment, if the first data processing module 201 outputs data at a rate of 50 kb/sec when the first data processing module 201 receives an instruction for outputting data at a rate of 40 kb/sec, the first data processing module 201 has to output data slower by 10% than the first reference output rate in order to match synchronization. Accordingly, the output rate adjusting unit 220 has to control the first data processing module 201 so that the data output rate of the first data processing module 201 becomes slower by 10% for the next unit time, and set the first ratio value to "110%" in order to adjust the data output rate.

The first ratio value can be expressed by the following Equation.

$$\text{first ratio value} = \frac{\text{first reference output rate} + (\text{real output rate} - \text{adjusted output rate})}{\text{first reference output rate}} \times 100$$

The ratio value calculator (not shown) calculates the first ratio value according to the Equation.

The first ratio value becomes "{100 kb/sec+(50 kb/sec−40 kb/sec)}/100 kb/sec*100=110". Simultaneously, if the second data processing module 202 outputs the amount of data corresponding to the second reference output rate information, the second ratio value will become "100%".

The output rate adjusting unit 220 instructs the first data processing module 201 to output data at a rate of "90%" on the basis of the first and second ratio values. Accordingly, the first data processing module 201 will output data at a rate of "90 kb/sec" for the next unit time.

Another exemplary embodiment of setting the first and second reference output rates respectively in the first and second data processing modules 201 and 202 will be now described.

A method of setting a reference output rate in each data processing module has been described above. That is, a method of setting a reference output rate using metadata or a method of setting, to a reference output rate, the amount of data output from a data processing module for a unit time from when synchronization is performed can be used.

In an exemplary embodiment, output rate information acquired by the output rate information acquiring unit 210 is a ratio value of a current data output rate of each data processing module with respect to reference output rate information.

That is, first data output rate information may be a first ratio value calculated by expressing as a percentage a current data output rate of the first data processing module 201 with respect to first reference output rate information. Also, second data output rate information may be a second ratio value calculated by expressing as a percentage a current data output rate of the second data processing module 202 with respect to second reference output rate information. Since the output rate information acquiring unit 210 cannot recognize the absolute amount of data which is output for a unit time from each data processing module, the output rate adjusting unit 220 adjusts the data output rates of the first and second data processing modules 201 and 202 only using the first and second ratio values. A method of adjusting the data output rates of the first and second data processing modules 201 and 202 only using the first and second ratio values has been described above.

If the first ratio value is greater than the second ratio value, the output rate adjusting unit 220 increases the data output rate of the second data processing module 202 in proportion to a difference value between the first ratio value and the second ratio value. For example, if the first ratio value is "100%" and the second ratio value is "80%", the difference value between the first and second rate values is 20%. Accordingly, the output rate adjusting unit 220 controls the second data processing module 202 to output data at a rate higher by 20% than a second reference output rate.

If the first ratio value is smaller than the second ratio value, the output rate adjusting unit 220 decreases the data output rate of the second data processing module 202 in proportion to a difference value between the first and second ratio values. For example, if the first ratio value is "80%" and the second ratio value is "90%", a difference value between the first and second rate values is "10%", and accordingly, the output rate adjusting unit 220 controls the second data processing module 202 to output data at a rate lower by 10% than the second reference output rate. According to aspects of the present invention, the output rate adjusting unit 220 can adjust the data output rate of the first data processing module 201, or can adjust both the data output rates of the first and second data processing modules 201 and 202, as described above.

Figure 3:
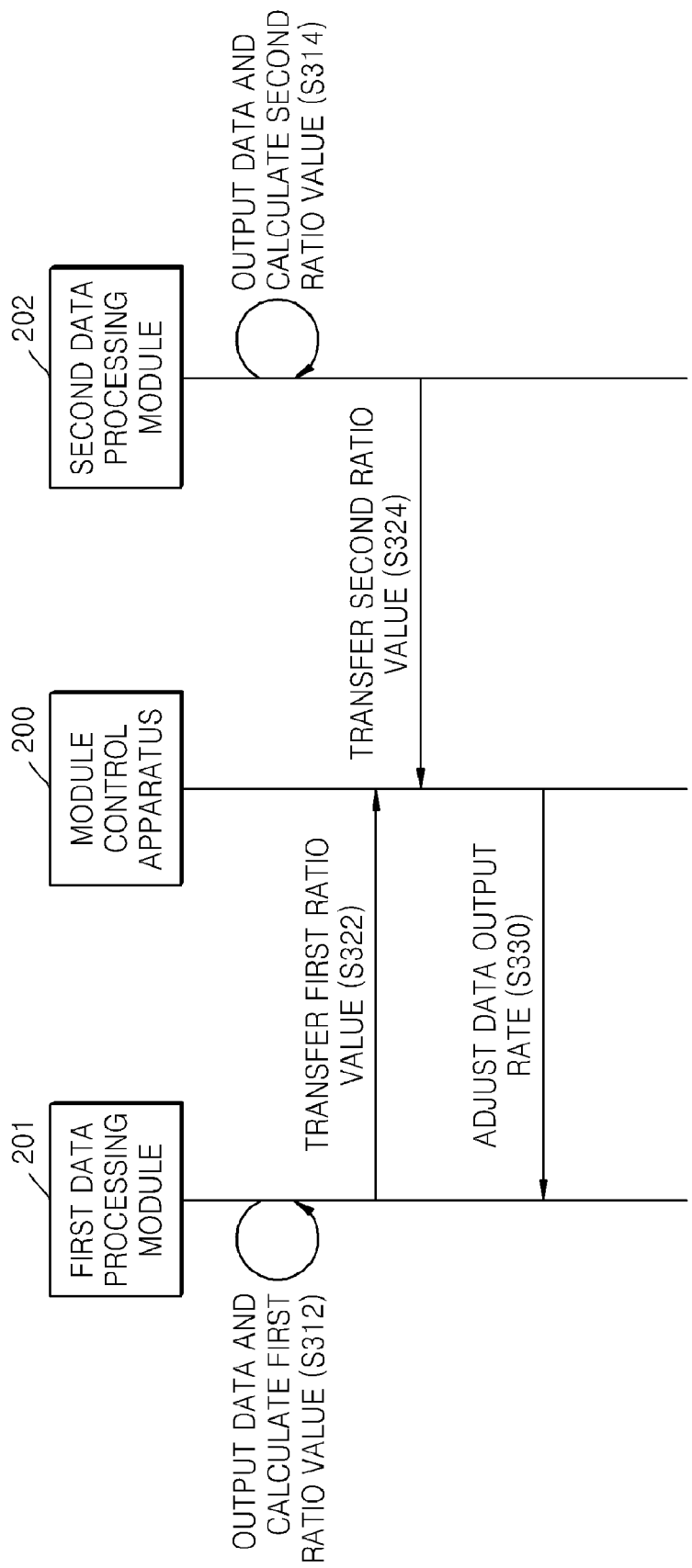
FIG. 3 is a view for explaining data flow between a module control apparatus and first and second data processing modules, according to an exemplary embodiment of the present invention.

FIG. 3 is a view for explaining data flow between the module control apparatus 200 and the first and second data processing modules 201 and 202, according to an exemplary embodiment of the present invention.

In FIG. 3, it is assumed that the first data processing module 201 may be a video renderer, the second data processing module 202 may be an audio renderer, and the module control apparatus 200 synchronizes data by controlling the data output rate of the first data processing module 201.

In operation S312, the first data processing module 201 outputs processed data to a display, and calculates a first ratio value representing a percentage of a current data output rate with respect to first reference output rate information.

In operation S314, the second data processing module 202 outputs processed data to a speaker, and calculates a second ratio value representing a percentage of a current data output rate with respect to second reference output rate information.

In operations S322 and S324, the first and second data processing modules 201 and 202 transfer the calculated percentages to the module control apparatus 200.

In operation S330, the module control apparatus 200 adjusts the data output rate of the first data processing module 201 using the first and second ratio values. For example, if an output rate of video data is higher than an output rate of audio data, the module control apparatus 200 reduces the data output rate of the first data processing module 201. Meanwhile, if an output rate of video data is lower than an output rate of audio data, the module control apparatus 200 increases the data output rate of the first data processing module 201. If the data processing module is a media component based on a pipe and filter architecture, the module control apparatus 200 adjusts a bandwidth of an output port included in the media component. Here, the term "bandwidth" may mean the size of data which is transmitted for a unit time. By adjusting a bandwidth of an output port of outputting data in the data processing module, a data output rate in the media component is adjusted. Particularly, by setting a bandwidth of the output port to "0", it is possible to discard data or keep data waiting for a predetermined time, according to predetermined conditions.

Figure 4:
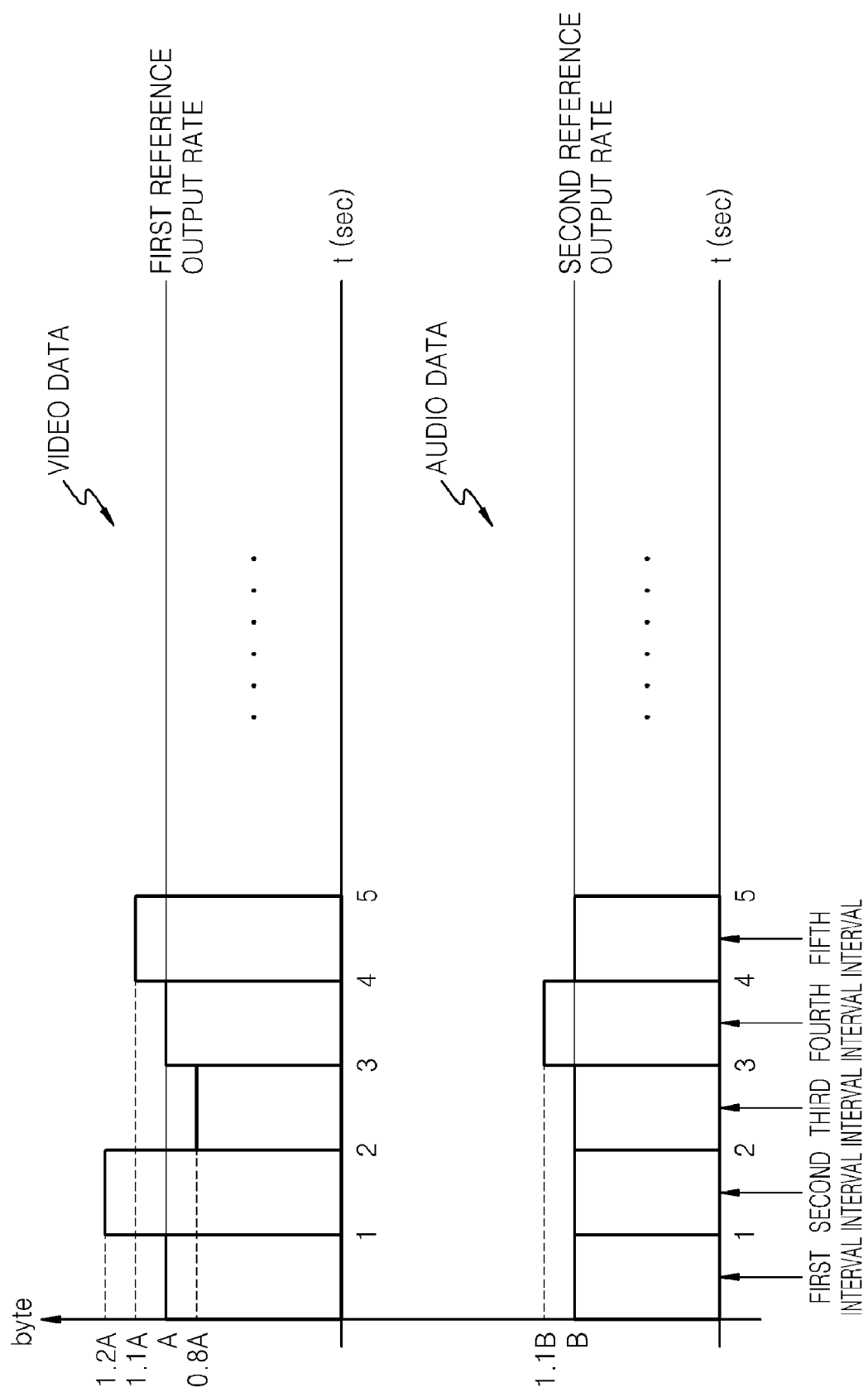
FIG. 4 is a view illustrating output data of the first and second data processing modules that are controlled by the module control apparatus, according to an exemplary embodiment of the present invention.

FIG. 4 is a view illustrating output data of the first and second data processing modules 201 and 202 that are controlled by the module control apparatus 200, according to an exemplary embodiment of the present invention. In FIG. 4, it is assumed that the first data processing module 201 may be a video renderer, and the second data processing module 202 may be an audio renderer.

As described above, the size of data which is output for a unit time from when synchronization is performed can be set to a reference output rate. In FIG. 4, if it is assumed that a first interval is a period where data is synchronized and output, first reference data output rate information is "A byte/sec", and second reference data output rate information is "B byte/sec".

In a second interval, a data output rate of the first data output module 201 is "1.2A byte/sec", and a data output rate of the second data output module 202 is "B byte/sec". This means that video data is outputted faster by 20% than audio data. Accordingly, the module control apparatus 200 decreases the output rate of the first data output module 201 by 20% for the next unit time.

In a third interval, the first data processing module 201 outputs data at a rate of "0.8A byte/sec" under the control of the module control apparatus 200. Accordingly, when three seconds elapse, the video data will be again synchronized to the audio data.

In a fourth interval, a data output rate of the first data output module 201 is "A byte/sec", and a second data output rate of the second data output module 202 is "1.1B byte/sec". This means that video data is outputted slower by 10% than audio data. Accordingly, the module control apparatus 200 increases the output rate of the first data processing module 201 by 10% for the next unit time.

In a fifth interval, the first data processing module 201 outputs data at a rate of "1.1A byte/sec" under the control of the module control apparatus 200. Accordingly, when five seconds elapse, the video data will be again synchronized to the audio data.

In a conventional method, since synchronization has been performed by keeping data waiting or by discarding data, the output rate of data could not be adjusted sharply. Accordingly, video data (or audio data) is not continuously transmitted, in such a manner as not to be output while waiting, and video data and audio data are simultaneously output at a predetermined timing. However, the conventional method may waste resources unnecessarily, or make synchronization unstable when another task having priority is performed. However, according to an exemplary embodiment of the present invention as illustrated in FIG. 4, since synchronization is performed by changing a rate at which data is output, a time at which no data is output does not exist and thus resources can be efficiently used. Particularly, since a sum of video data and audio data to be output does not exceed a predetermined value by properly adjusting the data output rates of two data processing modules, stable synchronization is possible when another task having priority is performed.

For example, in the case of audio data, since the quality of synchronization deteriorates when delay occurs, in many cases, synchronization is performed on the basis of audio data. In this case, by assigning priority to audio data, and transmitting video data from which the amount assigned to the audio data is subtracted, quality requirements can be satisfied without deteriorating the quality of video. For example, since it is possible to greatly change (for example, by 400%) the output rate of video data even when a change in the output rate of audio data is limited (for example, to 30%), synchronization according to exemplary embodiments of the present invention is better than that according to conventional methods.

Particularly, by properly adjusting a maximum value of data to be output, system loads can be reduced without being influenced when another task having priority is performed.

Figure 5A:
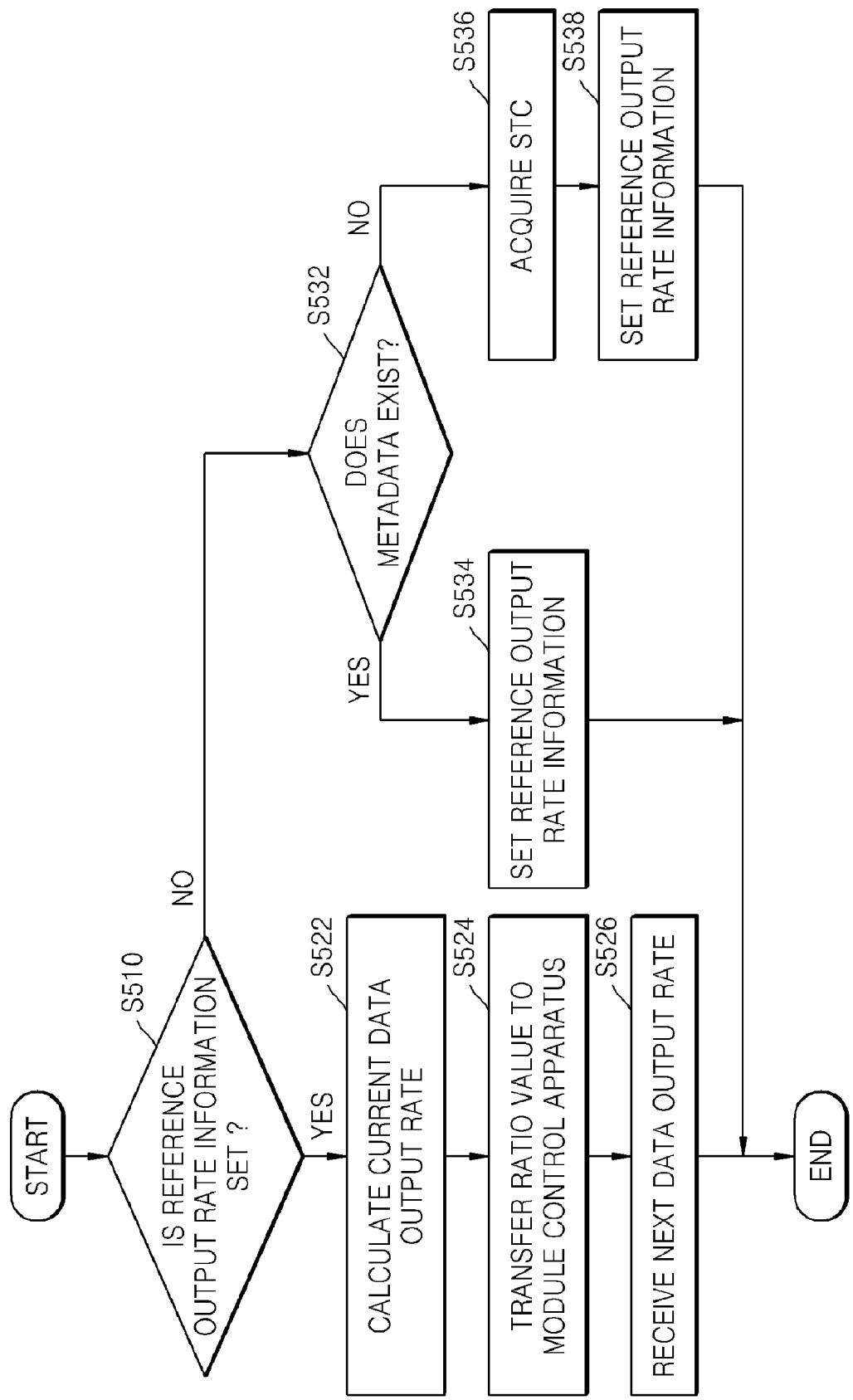
FIG. 5A is a flowchart of an output rate adjusting method which is performed by the first and second data processing modules, according to an exemplary embodiment of the present invention.

FIG. 5A is a flowchart of an output rate adjusting method which is performed by the data processing modules 201 and 202, according to an exemplary embodiment of the present invention.

In operation S510, it is determined whether reference output rate information is set.

If reference output rate information is set, in operation S522, a current data output rate is calculated. The current data output rate can be calculated by dividing the amount of data output for a predetermined time interval by the predetermined time.

Then, in operation S524, a ratio value is calculated by expressing the current data output rate as a percentage on the basis of the reference output rate information, and is transferred to the module control apparatus 200.

In operation S526, a next data output rate is received from the module control apparatus 200.

If no reference output rate information is set, a process for setting reference output rate information is performed. In operation S532, it is determined whether metadata about data output exists. If metadata about data output exists, operation S534 is performed to set reference output rate information. If no metadata exists, operation S536 is performed. In operation S536, an STC is acquired from the module control apparatus 200 so that data is synchronized and output. In operation S538, the size of data which is output for a unit time from when the data is synchronized and output is set to reference output rate information.

Figure 5B:
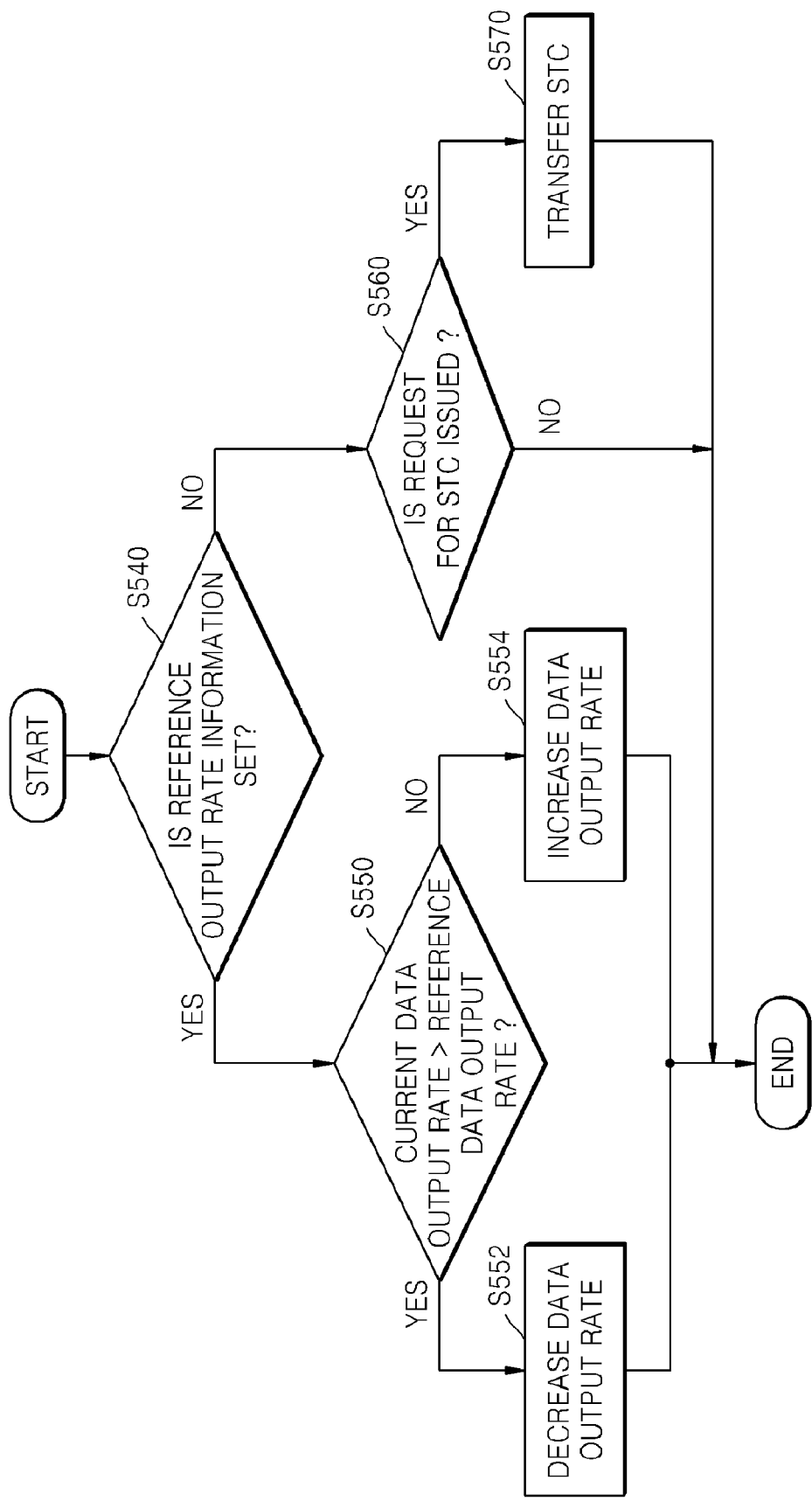
FIG. 5B is a flowchart of a method of controlling the first and second data processing modules, according to an exemplary embodiment of the present invention.

FIG. 5B is a flowchart of a method of controlling the first and second data processing modules 201 and 202, according to an exemplary embodiment of the present invention.

In operation S540, the module control apparatus 200 determines whether reference output rate information corresponding to each of the first and second data processing modules 201 and 202 is set.

If reference output rate information corresponding to each of the first and second data processing modules 201 and 202 is set, operation S550 is performed. In FIG. 5B, it is assumed that a data output rate of the first data processing module 201 is equal to the reference output rate information, and only a data output rate of the second data processing module 202 is adjusted. In operation s550, current data output rate information is received from the second data processing module 202, and it is determined whether the current data output rate is higher than the reference output rate. If the current data output rate is higher than the reference output rate, operation S552 is performed to decrease the data output rate of the second data processing module 202. On the contrary, if the current data output rate is lower than the reference output rate, operation S554 is performed to increase the data output rate of the second data processing module 201.

If no reference output rate information is set, operation S560 is performed to determine whether a request for an STC is issued. If a request for an STC is issued, operation S570 is performed to transfer an STC to a data processing module that has issued the request for the STC.

Figure 6:
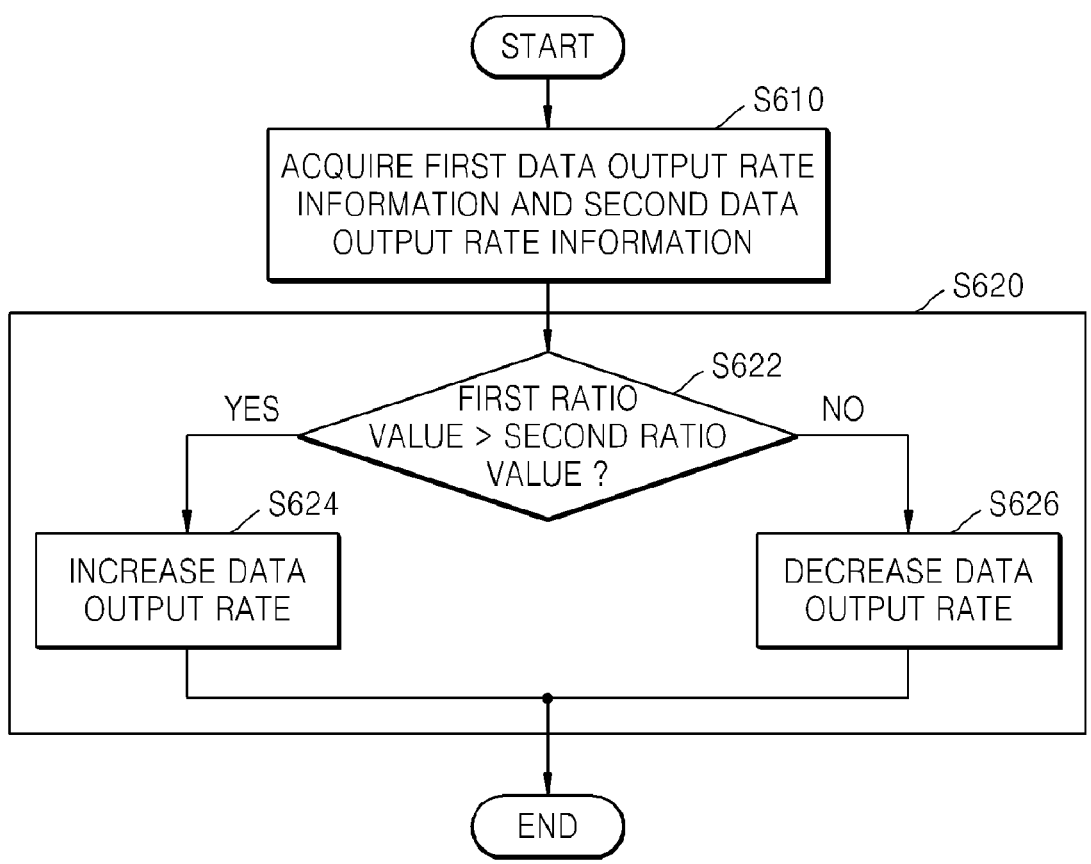
FIG. 6 is a flowchart of a module control method according to an exemplary embodiment of the present invention.

FIG. 6 is a flowchart of a module control method according to an exemplary embodiment of the present invention.

The module control method is a method of controlling first and second data processing modules that process data independently and synchronize and output the processed data, wherein at least one of the first and second data processing modules may be a media component based on a pipe and filter architecture.

In operation S610, first data output rate information representing a current data output rate of the first data processing module, and second data output rate information representing a current data output rate of the second data processing module are acquired.

In operation S620, a data output rate of at least one of the first and second data processing modules is adjusted on the basis of the first and second data output rate information. The first data output rate information is a first ratio value calculated by expressing as a percentage a current data output rate of the first data processing module with respect to the first reference output rate information, and the second data output rate information is a second ratio value calculated by expressing as a percentage a current data output rate of the second data processing module with respect to the second reference output rate information.

In operation S622, it is determined whether the first ratio value is greater than the second ratio value. If the first ratio value is greater than the second ratio value, operation S624 is performed to increase a data output rate of the second data processing module in proportion to a difference value between the first ratio value and the second ratio value. On the contrary, if the first ratio value is smaller than the second ratio value, operation S626 is performed to decrease a data output ratio of the second data processing module in proportion to a difference value between the first ratio value and the second ratio value. In FIG. 6, the data output rate of the second data processing module is adjusted, but the data output rate of the first data processing module can be adjusted, or both the data output rates of the first and second data processing modules can be adjusted.

The above-mentioned exemplary embodiments according to the present invention can be embodied as a program which can be executed by a computer, and can be implemented by a general purpose digital computer which operates the program using a computer-readable recording medium.

The computer-readable recording medium may include a magnetic storage medium (for example, ROM, floppy disk, hard disk, etc.), or an optical reading medium (for example, CD-ROM, DVD, etc.).

Alternatively, in another exemplary embodiment, the computer-readable recording medium may include a carrier wave (for example, transmission through the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a first data processing module and a second data processing module, the first data processing module and the second data processing module processing data independently and synchronizing and outputting the processed data, the method comprising:

acquiring first data output rate information representing a first current data output rate of the first data processing module;

acquiring, from first metadata of the first data processing module, first reference output rate information representing a first reference output rate of the first data processing module;

acquiring second data output rate information representing a second current data output rate of the second data processing module;

acquiring, from second metadata of the second data processing module, second reference output rate information representing a second reference output rate of the second data processing module; and adjusting a data output rate of at least one of the first data processing module and the second data processing module, based on the first data output rate information, the first reference output rate information, the second data output rate information, and the second reference output rate information.

2. The method of claim 1, wherein the at least one of the first data processing module and the second data processing module is a media component based on a pipe and filter architecture.

3. The method of claim 1, further comprising:

calculating a first ratio value of the first current data output rate to the first reference output rate representing a first initial data output rate of the first data processing module, and calculating a second ratio value of the second current data output rate to the second reference output rate information representing a second initial data output rate of the second data processing module, wherein the adjusting of the data output rate of the at least one of the first data processing module and the second data processing module is based on the first ratio value and the second ratio value.

4. The method of claim 1, further comprising:

calculating a first ratio value calculated by expressing as a percentage the first current data output rate of the first data processing module with respect to the first reference output rate information; and calculating a second ratio value calculated by expressing as a percentage the second current data output rate of the second data processing module with reference to the second reference output rate information, wherein the first reference output rate is a first initial data output rate of the first data processing module, and the second reference output rate is a second initial data output rate of the second data processing module.

5. The method of claim 4, wherein at least one of the first reference output rate and the second reference output rate is set based on metadata about output data acquired from the at least one of the first data processing module and the second data processing module.

6. The method of claim 4, wherein the first reference output rate information comprises a size of data output from the first data processing module for a unit time from when the data output from the first data processing module is synchronized to data output from the second data processing module, and the second reference output rate information comprises a size of the data output from the second data processing module for the unit time from when the data output from the first data processing module is synchronized to the data output from the second data processing module.

7. The method of claim 4, wherein the adjusting of the data output rate of the at least one of the first data processing module and the second data processing module comprises increasing the data output rate of the second data processing module, in proportion to a difference value between the first ratio value and the second ratio value, if the first ratio value is greater than the second ratio value.

8. The method of claim 4, wherein the adjusting of the data output rate of the at least one of the first data processing module and the second data processing module comprises decreasing the data output rate of the second data processing module, in proportion to a difference value between the first ratio value and the second ratio value, if the first ratio value is smaller than the second ratio value.

9. The method of claim 1, wherein the first data processing module is a video renderer, and the second data processing module is an audio renderer.

10. An apparatus of controlling a first data processing module and a second data processing module, the first data processing module and the second data processing module processing data independently and synchronizing and outputting the processed data, the apparatus comprising:
    an output rate information acquiring unit which acquires first data output rate information representing a first current data output rate of the first data processing module, and acquires second data output rate information representing a current second data output rate of the second data processing module;
    a reference output rate setting unit which acquires, from first metadata of the first data processing module, first reference output rate information representing a first reference output rate of the first data processing module, and acquires, from second metadata of the second data processing module, second reference output rate information representing a second reference output rate of the second data processing module; and
    an output rate adjusting unit which adjusts a data output rate of at least one of the first data processing module and the second data processing module, based on the first data output rate information, the first reference output rate information, the second data output rate information, and the second reference output rate information.

11. The apparatus of claim 10, wherein the at least of the first data processing module and the second data processing module is a media component based on a pipe and filter architecture.

12. The apparatus of claim 10, further comprising a ratio value calculator which calculates a first ratio value of the first current data output rate to the first reference output rate information representing a first initial data output rate of the first data processing module, and calculates a second ratio value of the second current data output rate to the second reference output rate information representing a second initial data output rate of the second data processing module,
    wherein the output rate adjusting unit adjusts the data output rate of the at least one of the first data processing module and the second data processing module based on the first ratio value and the second ratio value.

13. The apparatus of claim 10, further comprising a ratio value calculator that calculates a first ratio value calculated by expressing as a percentage the first current data output rate of the first data processing module with respect to the first reference output rate information, calculates a second ratio value calculated by expressing as a percentage the second current data output rate of the second data processing module with respect to the second reference output rate information,
    wherein the first reference output rate is a first initial data output rate of the first data processing module, and
    the second reference output rate is a second initial data output rate of the second data processing module.

14. The apparatus of claim 13, wherein at least one of the first reference output rate and the second reference output rate is set based on metadata about output data acquired from the at least one of the first data processing module and the second data processing module.

15. The apparatus of claim 13, wherein the first reference output rate information comprises a size of data output from the first data processing module for a unit time from when the data output from the first data processing module is synchronized to data output from the second data processing module,
    the second reference output rate information comprises a size of the data output from the second data processing module for the unit time from when the data output from the first data processing module is synchronized to the data output from the second data processing module.

16. The apparatus of claim 13, wherein the output rate adjusting unit increases the current data output rate of the second data processing module, in proportion to a difference value between the first ratio value and the second ratio value, if the first ratio value is greater than the second ratio value.

17. The apparatus of claim 13, wherein the output rate adjusting unit decreases the current data output rate of the second data processing module, in proportion to a difference value between the first ratio value and the second ratio value, if the first ratio value is smaller than the second ratio value.

18. The apparatus of claim 10, wherein the first data processing module is a video renderer, and the second data processing module is an audio renderer.

19. A non-transitory computer-readable recording medium having a program embodied thereon, which when executed by a computer, the program causing the computer to execute a method of controlling a first data processing module and a second data processing module, the first data processing module and the second data processing module processing data independently and synchronizing and outputting the processed data, the method comprising:
    acquiring first data output rate information representing a first current data output rate of the first data processing module;
    acquiring, from first metadata of the first data processing module, first reference output rate information representing a first reference output rate of the first data processing module;
    acquiring second data output rate information representing a second current data output rate of the second data processing module;
    acquiring, from second metadata of the second data processing module, second reference output rate information representing a second reference output rate of the second data processing module; and
    adjusting a data output rate of at least one of the first data processing module and the second data processing module, based on the first data output rate information, the first reference output rate information, the second data output rate information, and the second reference output rate information.

* * * * *